Figure 4:
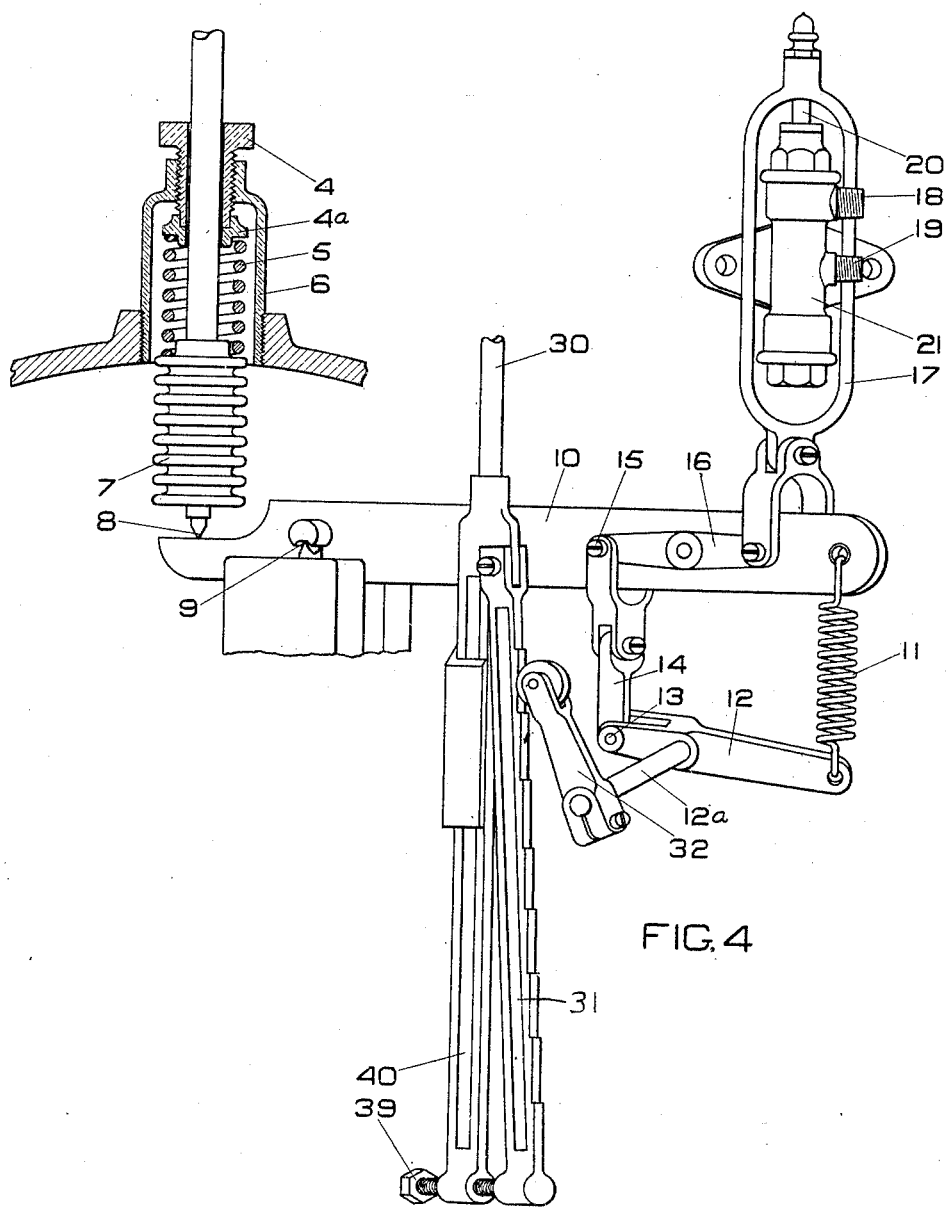

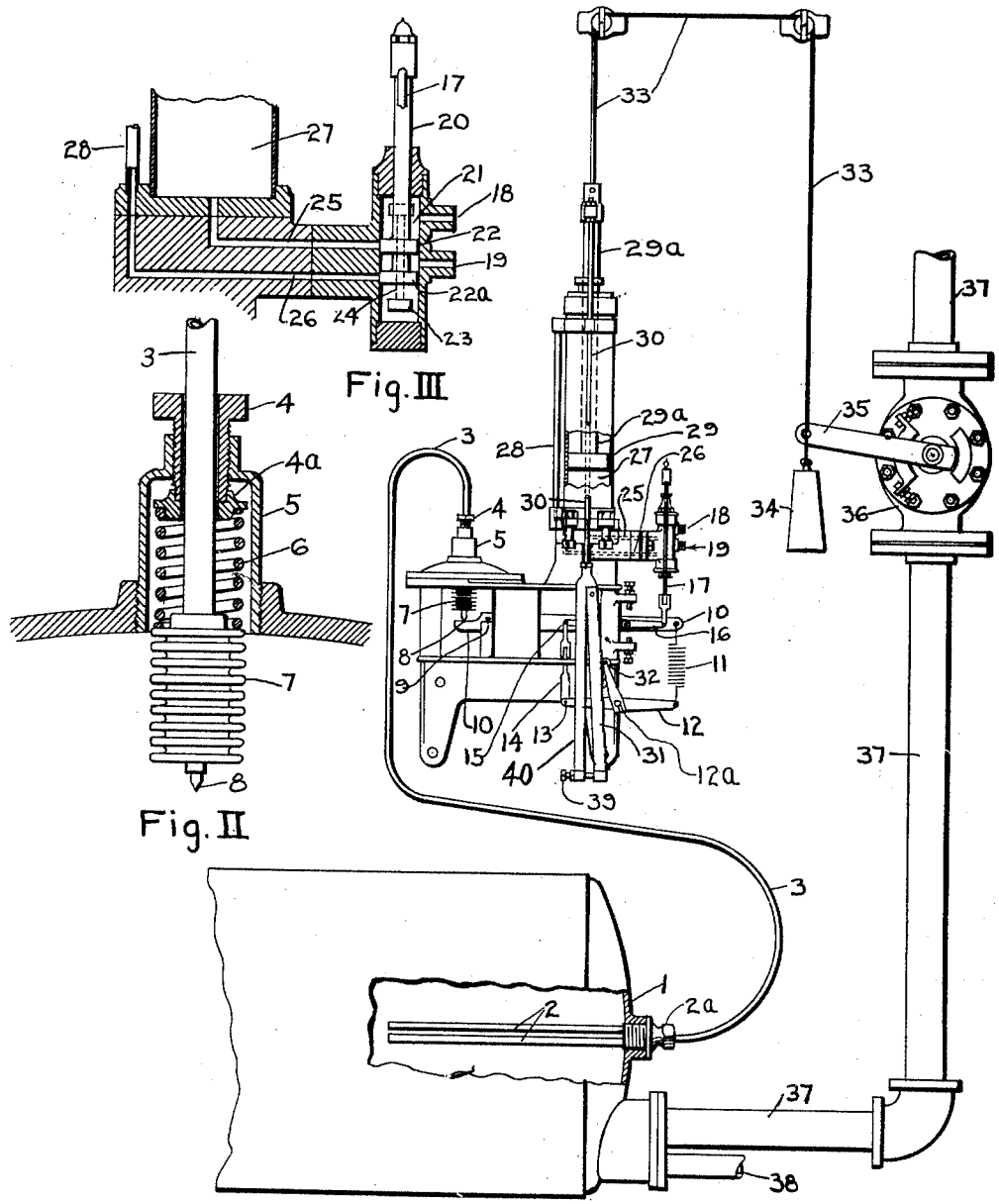

Dec. 3, 1929. J. L. KIMBALL 1,738,073
THERMOSTATIC CONTROL APPARATUS AND METHOD
Filed June 26, 1922 2 Sheets-Sheet 2

James L. Kimball
INVENTOR

Patented Dec. 3, 1929

1,738,073

UNITED STATES PATENT OFFICE

JAMES LEWIS KIMBALL, OF SALEM, MASSACHUSETTS, ASSIGNOR TO RUGGLES-KLINGEMANN MFG. COMPANY, OF SALEM, MASSACHUSETTS, A CORPORATION OF MASSACHUSETTS

THERMOSTATIC-CONTROL APPARATUS AND METHOD

Application filed June 26, 1922. Serial No. 570,905.

My invention relates to new and useful improvements in thermostatic control apparatus for heating or ventilating systems, whereby the temperature of air or fluids may be maintained within a definite range.

One of the objects of my invention is to provide a powerful fluid-pressure motor which can be used to control large-size valves, or heavy dampers, or which may be used to shift belts, or operate clutches in the control of drying machines, where the speed of the machine and the temperature of the drying fluid or air are related, or for the control of rheostats for the control of electric motors for operating fans, as in heating and ventilating systems.

Another object of my invention is to provide compensating means whereby the fluid-pressure motor will operate incrementally, preferably by steps, and not to make a complete stroke upon a slight variation in temperature, and to provide means whereby the total variation in temperature between operating limits of the fluid-pressure motor may be varied within certain limits.

A further object is to provide thermostatic means which will quickly absorb and radiate sudden variations of temperature and also to provide means to protect the thermostat against the damaging results of a rise in temperature beyond that to which it has been adjusted. With these and other objects in view, the invention consists of the improved thermostatic-control apparatus a preferred embodiment of which will be made clear in the following specification, and illustrated in the accompanying drawings.

In the drawings, Fig. (1) represents the application of my invention to a steam valve, supplying steam to a water heater, this being one of many uses to which this invention is applicable; Figure (2) shows an enlarged view of the corrugated diaphragm which forms the motor of the thermostat, and also the method of adjustment for various temperatures; Figure (3) shows a section of the pilot valve, which is operated from the thermostat and controls the position of the controller; and Fig. 4 is an enlarged perspective view of a portion of the mechanism shown in Fig. 1.

Referring to Figure (1)—(1) represents a heater for heating fluids; (2) represents that part of a thermostatic device which extends within the heater and is submerged in the fluid. To the end (2$^a$) outside the heater is connected a flexible tube (3) which extends to a diaphragm motor (7). These parts constitute a container that is more or less filled with an expansive fluid which gives motion to point (8) of the diaphragm motor as the temperature of this fluid is varied.

It will be noticed that the part 2 of the thermostatic device which enters the heater shows two tubes. The reason for this is that the heating service, in relation to the cubical contents of the tubes, is increased over that of a single tube, and the heat is more readily absorbed and radiated. Any number of the tubes may be supplied. The larger the number, the quicker the diaphragm motor will respond to variations of temperature in the heater.

An adjusting screw (4) is used to increase or decrease the temperature at which the controller acts. This is effected by adjusting the position of the diaphragm motor so as to cause a greater or less expansion of the fluid contained in the thermostat, and consequently a greater or less movement of the contacting point (8) before the latter engages the operating mechanism of the controller.

A spring (6) is inserted between the adjusting nut (4) and the diaphragm motor (7), the function of which is to provide means whereby the diaphragm motor (7) may be expanded in a reverse direction to that required to operate the fluid-pressure motor and thereby prevent an excessive pressure being built up within the thermostat in case the temperature in the heater exceeds the operating limit for which it has been adjusted.

I shall now explain the operation of the controller. A lever (10) is fulcrumed at (9) and is in contact with the motor diaphragm at (8). An arm (16) is pivoted at or near its center position to the lever (10). The right hand end of the arm (16) is connected to the pilot-valve yoke (17), and the left-hand end of the arm (16) is connected to the left-hand end of an equalizing arm (12) at (13) and (15) by suitable linkage (14). It will be seen that any motion imparted to the lever (10) at the point (8) will be communicated to the pilot-valve yoke (17), the motion of the yoke being multiplied over that of the scale beam (10) by reason of the arm (16) being stationary at such time at (15). The arm (16) remains stationary until actuated, through the linkage (14), by the steps of a wedge (31) engaging an arm (32), as hereinafter described.

Referring to Figs. (3) and (4), it will be seen that the yoke (17) is connected to the pilot valve (20). The pilot valve (20) has cylindrical portions (22) and (22$^a$) which control the admission of fluid under pressure to and from the motor cylinder (27). The fluid is admitted under pressure at (19) and is exhausted at (18). On an upward movement of the valve (20), fluid is admitted under pressure to the cylinder 27 by a port (25), and at the same time, a port (26) is opened to the atmosphere, the passage being, through a port (23) and a passage (24), to the top of the valve casing (21), whence the fluid under pressure goes to waste through the exhaust connection (18). On a downward movement of the valve (20), the fluid is admitted under pressure to the port (26) and the port (25) is directly vented to the top cavity of the valve casing (21). It will be understood that the port (26) extends to the top of the cylinder (27) through a pipe (28) and the fluid under pressure, when admitted above the piston (29), effects a downward movement of the plunger (29$^a$); likewise, the fluid that is admitted under pressure through the port (25) effects an upward movement of the plunger (29$^a$). In the operation of the apparatus, as so far explained, it will be seen that variations in temperature are absorbed or radiated by the thermostat, the fluid within the thermostat remaining at the practically constant temperature that it is desired to maintain, and these variations affect the pressure within the thermostat and impart motion to the point (8) of the motor diaphragm; which, in turn, effects the necessary motion to the valve (20) from its neutral position to either of its effective positions; and the plunger (29$^a$) travels up and down on variations of temperature within the heater (1), and these variations of temperature are corrected by the plunger (29$^a$) opening or closing the steam valve (36) and controlling the steam to the heater through a pipe (37), the drip or condensation from the heater coil being discharged at (38). The actuating arm (35) of the steam valve (36) is illustrated as connected with the motor plunger (29$^a$) by means of a flexible cord chain (33) over sheaves, the actuating arm being actuated in one direction by the motor plunger (29$^a$) and in the opposite direction by a counter-weight (34). The counter-weight (34) may, however, be omitted if the arm (35) is rigidly connected with the motor plunger (29$^a$).

So far, I have explained the operation of the fluid-pressure motor without any reference to its compensating means. It will be understood that there will be more or less of a time lag in the thermostat before variations of temperature in the heater can be absorbed or radiated by the thermostat; and if there were no compensating means, this would mean that the plunger would travel past the point where it should have stopped to effect the required degree of opening or closing of the valve 36 corresponding to the proper amount of steam required to heat a certain quantity of water. This would mean a continuous movement up and down of the plunger (29$^a$), or, in other words, hunting action, which would result in a variation of the temperature of the fluid or air to be heated.

This is overcome by an improved compensating means which allows only a limited travel of the plunger (29$^a$), whereupon the plunger is brought to rest to await a further variation in temperature before proceeding to the next stage of travel. This compensating attachment operates on the principle of variations in temperature moving the pilot valve (20) to a pressure position, and plunger (29$^a$), acting through the compensating attachment, returning the pilot valve (20) to a neutral position at each step or cut-off point.

In the preferred compensator, the hinged wedge (31) is connected to the top of the plunger (29$^a$) by a rod (30) and moves up and down with the plunger. The arm (32) is provided with a roll at its end in contact with the stepped face of this wedge (31). The opposite end of the arm (32) is secured to a shaft (12$^a$), which is a part of the arm (12). The arm (12) oscillates on its center bearing. A spring (11) connects the lever (10) to the arm (12) and holds the roll of the arm (32) in contact with the stepped face of the wedge (31). It will be seen that when the arm (10) is raised by elongation of the diaphragm motor (7), the pilot valve (20) will be moved upward to a pressure position, admitting fluid under pressure through the port (25) and under the piston (29), which moves the plunger (29$^a$) upward. The compensating wedge (31) is therefore also caused to move upward, causing the roll on the arm (32) to engage a higher step. The arm (12) and the arm (16) are therefore oscillated to lower the pilot valve (20) and return the pilot valve to a neutral position. At the same time an increased counter-acting force is applied to the lever (10) by the spring (11), which means that a new temperature value must be set up before the plunger can be moved to a new position. On a downward movement of the lever (10), the pilot valve is moved downward to a pressure position which admits fluid under pressure through the port (26) to the top of the piston (29). The plunger therefore moves downward and the roll on the arm (32) engages a lower step position. The arm (12) and the arm (16) are therefore again oscillated to effect a raising of the pilot valve stem (20) to its neutral position and to close off the pressure supply to the motor cylinder 27.

A complete operation of the apparatus, as shown, is as follows: The controller normally assuming a position in which the steam valve (36) is wide open, steam is admitted to the pipe (37). Water is supplied to the heater (1) in the customary way. The temperature of the water is raised by the steam and heat is absorbed by the thermostat (2) until a pressure is generated within the thermostat sufficient to move the point (8) of the motor diaphragm in contact with the fulcrumed end of the lever (10), the downward movement at this point (8) giving an upward movement to the end supporting the arm (16), the arm (16) being held stationary at 15, at its left-hand end and pivoted at its center to the lever (10). The right-hand end, which is connected to and operates the pilot valve (20), will be moved upward with an increased motion, causing an upward movement of the piston (29), the plunger (29ª) and the step wedge (31). It will be noticed that this wedge is provided with steps, and as the roll engages a higher step position, the arm (12) will be oscillated, raising the point (15) of arm (16). As this arm is pivoted to the lever (10) at or near its center, the right-hand end will be lowered, returning the pilot valve to a neutral position and bringing the valve (36) to a cut-off position. Therefore, this valve (36) will be moved from one cut-off position to another, supplying steam in accordance with the temperature of the water in the heater. It should be understood that step compensating of a fluid-pressure motor of this class is impossible without means for adjustment as to temperature operating range between minimum and maximum steam supply. For this reason the compensating arrangement includes means for adjusting the angularity of the compensating wedge, so as to effect a cut-off at each step, regardless of the sudden changes or demand for hot water. In case of a uniform demand on the heater, satisfactory compensating action could be obtained with a comparatively small range between operating limits; but with sudden demands, a greater temperature range between operating limits must be provided for, and the angularity of the wedge may be increased to effect this result. It will be seen that the further the pilot valve (20) is moved out of its neutral position by sudden changes of temperature, the greater the angularity of the compensating wedge must be in order to move the pilot valve back to a neutral position and effect a stopping of the plunger (29ª), at each step on the compensating wedge (31); therefore, an adjusting screw (39) is provided for varying the angularity of the stepped wedge (31) in relation to its supporting member (40).

It will be seen that a thermostat having multiple tubes having large heating and radiating service in comparison to its cubical contents has a greater advantage in responding to sudden changes in temperature.

It will also be understood that the spring (6), which provides a yielding force, will protect the diaphragm motor and the thermostat in case the temperature exceeds that to which the apparatus is adjusted. Otherwise, after the point (8) has reached its limit stop, an excessive pressure would be built up in the motor diaphragm and the thermostat, which would cause it to be strained, if not burst, and while the spring, under normal temperature, is sufficiently rigid to permit the adjustment of the motor diaphragm without yielding or compressing, yet it would yield before any damage could be done to the thermostat.

What I claim is new and desire to protect by Letters Patent, is:

1. In combination with a heat-controlling device, a thermostatic device for actuating the same comprising a diaphragm motor and an expansive-fluid container, said fluid container comprising multiple compartments having a relatively large heating and radiating surface in relation to its cubical contents, a conduit extending from said compartments to the diaphragm motor, said diaphragm motor having a limited movement in one direction for operating the controlling device and yielding movement in the opposite direction.

2. In combination with a heat-controlling device a thermostatic device therefor comprising a diaphragm motor and a closed chamber for containing an expansive fluid, a conduit extending from said chamber to the diaphragm motor, said diaphragm motor being expanded in one direction by increase in temperature applied to said chamber, and arranged to be expanded in the opposite direction by the rise in said temperature beyond a predetermined value.

3. In combination with a heat-controlling device a thermostatic device for actuating the same comprising a diaphragm motor and a closed container having multiple compartments for containing an expansive fluid, and a conduit connection leading from said compartments to the diaphragm motor, said diaphragm motor being adapted to be expanded in one direction to operate the heat-controlling device upon a predetermined expansion of the fluid in said container, and to be expanded in the opposite direction upon the occurrence of an abnormal expansion of said fluid.

4. A regulator for regulating the temperature of a fluid having, in combination, a thermostat comprising a thermostatic device, a thermostatic motor and an expansive-fluid container connecting the thermostatic device and the thermostatic motor, the thermostatic device being immersed in the fluid to be regulated, the expansive fluid in the expansive-fluid container being adapted to expand and contract in accordance with deviations in the temperature of the fluid in the fluid container, a regulating motor, two elements for controlling the regulating motor having a relative neutral position in which the regulating motor is maintained against operation and two effective positions in which they control the operation of the regulating motor in opposite directions, means connecting the elements with the thermostatic motor to cause the elements to become relatively actuated by the thermostatic motor to one or the other of their relative effective positions to cause the actuation of the regulating motor, and means controlled by the regulating motor for opposing the action of the thermostatic motor and causing a relative return of the elements to the relative neutral position.

5. A method of regulating the temperature of a liquid by supplying steam to the liquid through a valve that may be progressively opened and closed, the valve having a normal position in which it is open to a predetermined degree corresponding to a normal temperature of the liquid, the said method comprising opening and closing the valve incrementally progressively to one side or the other of the normal position when the temperature of the liquid respectively falls below and rises above the normal temperature, and controlling the degree of opening and closing of the valve in accordance with the degree of deviation in the temperature of the liquid from the normal temperature to correspondingly control the quantity of steam supplied to the liquid through the valve.

6. A method of regulating the temperature of a liquid so as to minimize over-correction and hunting action by supplying steam to the liquid through a motor-controlled valve that may be incrementally opened and closed by the motor, the valve having a normal position in which it is open to a predetermined degree corresponding to a normal temperature of the liquid, the said method comprising operating the motor incrementally to open and close the valve incrementally to one side and the other of the normal position when the temperature of the liquid respectively falls below and rises above the normal temperature, and controlling the incremental operation of the motor to control the degree of opening and closing of the valve in accordance with the degree of deviation in the temperature of the liquid from the normal temperature to correspondingly control the quantity of steam supplied to the liquid through the valve.

JAMES LEWIS KIMBALL.